(12) United States Patent  
Ramsey et al.

(10) Patent No.: US 8,801,013 B2
(45) Date of Patent: Aug. 12, 2014

(54) HANGER ARRANGEMENT FOR HEAVY-DUTY VEHICLE AXLE/SUSPENSION SYSTEMS

(71) Applicants: John E. Ramsey, Canton, OH (US); Brian R. Anderson, Canton, OH (US)

(72) Inventors: John E. Ramsey, Canton, OH (US); Brian R. Anderson, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/754,031

(22) Filed: Jan. 30, 2013

(65) Prior Publication Data

US 2013/0193660 A1    Aug. 1, 2013

Related U.S. Application Data

(60) Provisional application No. 61/592,623, filed on Jan. 31, 2012.

(51) Int. Cl.
*B60G 9/00*    (2006.01)

(52) U.S. Cl.
USPC .................................................. 280/124.11

(58) Field of Classification Search
USPC ........... 280/124.1, 124.11, 124.111, 124.112, 280/124.128, 124.153
See application file for complete search history.

(56) References Cited

U.S. PATENT DOCUMENTS

| | | | |
|---|---|---|---|
| 3,406,439 A | 10/1968 | Hutchens | |
| RE30,308 E | 6/1980 | Masser | |
| 5,037,126 A | 8/1991 | Gottschalk et al. | |
| 5,118,131 A * | 6/1992 | Manning | 280/124.109 |
| 5,335,932 A | 8/1994 | Pierce | |
| 5,393,096 A | 2/1995 | Pierce et al. | |
| 5,639,110 A | 6/1997 | Pierce et al. | |
| 6,276,710 B1 * | 8/2001 | Sutton | 280/678 |
| 6,425,593 B2 | 7/2002 | Fabris et al. | |
| 6,916,037 B2 | 7/2005 | Baxter et al. | |
| 7,731,211 B2 | 6/2010 | Ramsey | |
| 7,775,535 B2 | 8/2010 | Bluff et al. | |
| 8,006,990 B1 * | 8/2011 | Davis et al. | 280/124.175 |
| 8,573,620 B2 * | 11/2013 | Batdorff | 280/124.163 |

FOREIGN PATENT DOCUMENTS

WO    2011119020 A1    9/2011

* cited by examiner

*Primary Examiner* — Faye M. Fleming
(74) *Attorney, Agent, or Firm* — Dureska, Kennedy & Moore, L.L.C.; David P. Dureska; Brent L. Moore

(57) ABSTRACT

A hanger arrangement for heavy-duty vehicle axle/suspension systems includes a pair of front hangers transversely spaced from one another and attached to the vehicle. A pair of transversely spaced rear hangers are spaced longitudinally rearwardly from the front hangers and are attached to the vehicle. A first axle/suspension system is mounted on the front pair of hangers and a second axle/suspension system is mounted on the rear pair of hangers. The pair of front hangers include a rear edge that extends generally downwardly frontwardly toward the front end of the vehicle. The pair of rear hangers include a front edge extending generally downwardly rearwardly toward the rear end of the vehicle.

9 Claims, 9 Drawing Sheets

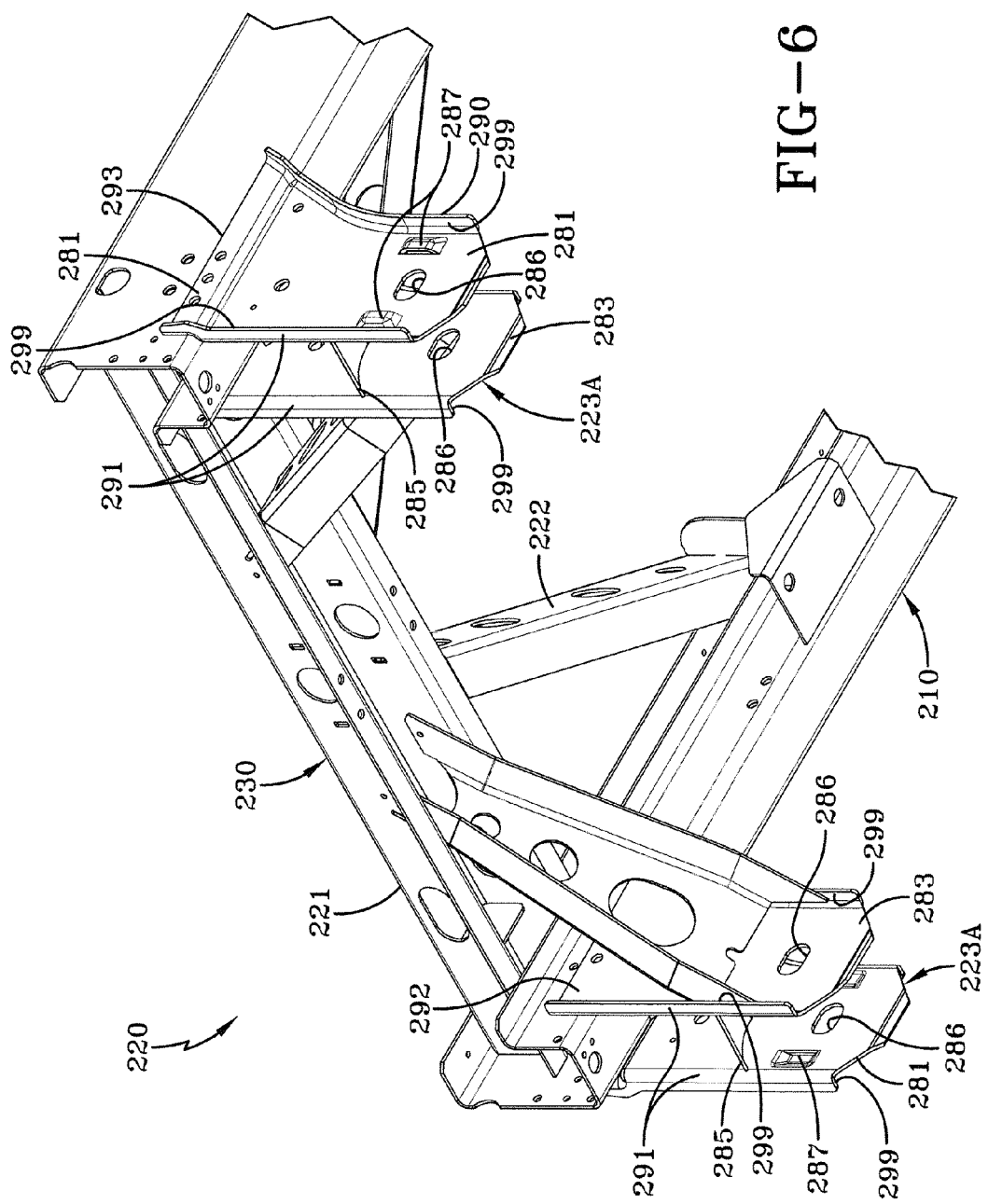

HANGER ARRANGEMENT FOR HEAVY-DUTY VEHICLE AXLE/SUSPENSION SYSTEMS

CROSS-REFERENCE TO RELATED APPLICATION

This application claims the benefit of U.S. Provisional Patent Application Ser. No. 61/592,623, filed Jan. 31, 2012.

BACKGROUND OF THE INVENTION

Field of the Invention

The invention relates generally to semi-trailers and to frames for semi-trailers. More particularly, the invention is directed to hangers for a semi-trailer subframe, which are used to mount axle/suspension systems to the semi-trailer subframe. More specifically, the invention is directed to an arrangement for the front and rear hangers of a subframe of a heavy-duty vehicle, where the top portion of each one of the front pair of hangers extends further in the rearward direction than the bottom portion of each hanger, and thus the rear portion of each one of the front pair of hangers extends and tapers generally downwardly toward the front end of the vehicle. The top portion of each one of the rear pair of hangers extends further in the frontward direction than the bottom portion of each hanger, and thus the front portion of each one of the rear pair of hangers extends and tapers generally downwardly toward the rear end of the vehicle. This arrangement of the front and rear pairs of hangers reduces the concentrated stresses near the front end of the rear pair of hangers during operation of the heavy-duty vehicle and allows less material to be utilized in the slider box weldment, thereby reducing the weight of the subframe and allowing the vehicle to carry more cargo and also providing increased life of the hangers and the main members.

BACKGROUND ART

Heavy-duty wheeled vehicles, such as tractor-trailers or semi-trailers, typically include one or more suspension assemblies that connect the wheel-bearing axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. Subframes have been utilized on tractor-trailers for many years. The subframe is a box-like structure that is mounted on the underside of the trailer body of the tractor-trailer and one or more axle/suspension systems, which each typically include a pair of suspension assemblies, are suspended from the subframe structure. For those heavy-duty vehicles that support a subframe, the subframe can be non-movable or movable, the latter being commonly referred to as a slider box, slider subframe, slider undercarriage, or secondary slider frame. A trailer having a slider box gains an advantage with respect to laws governing maximum axle loads. Proper placement of the slider box varies individual axle loads or redistributes the trailer loads so that it is within legal limits. Once properly positioned, the slider box is locked in place on the underside of the trailer by a retractable pin mechanism. For the purpose of convenience and clarity, reference herein will be made to slider boxes, with the understanding that such reference is by way of example, and that the present invention applies to heavy-duty vehicles having main members, such as primary frames, movable subframes and non-movable subframes.

An axle/suspension system is typically suspended from the main members of the slider box by a pair of transversely aligned and spaced-apart depending hangers. More specifically, each suspension assembly of an axle/suspension system includes a longitudinally extending elongated beam. Each beam typically is located adjacent to and below a respective one of a pair of spaced-apart longitudinally extending main members and one or more cross members, which form the slider box of the vehicle. Each beam is pivotally connected at one of its ends to a hanger, which in turn is attached to and depends from a respective one of the main members of the slider box of the vehicle. An axle extends transversely between and typically is connected by some means to the beams of the pair of suspension assemblies at a selected location from about the mid-point of each beam to the end of the beam opposite from its pivotal connection end. The end of each beam opposite the pivotal connection end also is connected to a bellows air spring or its equivalent, which in turn is connected to a respective one of the main members.

Vehicles containing more than one non-steerable axle, including tractor-trailers, are subject to lateral or side loads. Lateral loads can act through the slider box in opposite directions, and the effect of such bending loads on the slider box can be significant. Moreover, a slider box is subjected to large vertical and longitudinal loads. Thus, the loads imparted on the slider box must be effectively controlled by the slider box design.

In addition, because the axle/suspension system is typically suspended from the slider box by a pair of aligned and spaced-apart depending hangers, the hangers also contribute to distribution of loads from the axle/suspension system to the slider box during operation of the tractor-trailer. It should be noted that for purposes of the instant application, the hangers do not constitute part of the subframe or part of the axle/suspension system, but rather are a transitional structural element between the two components. Prior art hangers typically include spaced-apart inboard and outboard sidewalls that are attached to one another along the front edge of the hanger. More particularly, the hanger includes a generally U-shaped horizontal cross section having an outboard wall, a front wall and an inboard wall. A flange extends inboard from the rear edge of the inboard wall of the hanger and is attached to the cross member of the slider box. A shock mount may be attached to the rear surface of the flange by welds. A pair of aligned openings are formed through the outboard wall and the inboard wall of the hanger. A pair of alignment guides are formed on the outboard surface of the outboard wall of the hanger. The hanger is mounted on the main member of the slider box via a weld, which extends around the upper edge of the outboard wall, the front wall and the inboard wall of the hanger.

Each of the front and rear pairs of hangers are similarly arranged on the slider box so that the rear portion of the hangers extends and tapers generally downward toward the front end of the slider box. More specifically, the slider box includes a pair of spaced-apart depending front hangers, wherein the top portion of each hanger extends further in the rearward direction than the bottom portion of the hanger and, thus, the rear portion of each one of the front pair of hangers extends and tapers generally downwardly toward the front end of the vehicle. The slider box also includes a pair of spaced-apart depending rear hangers, wherein the top portion of each hanger extends further in the rearward direction than the bottom portion of the hanger and, thus, the rear portion of each one of the rear pair of hangers also extends and tapers generally downwardly toward the front end of the vehicle. Prior art hangers were conventionally arranged in this manner because it was thought that the multi-directional loads, including lateral, vertical and longitudinal loads, acting on the front and rear hangers were concentrated at the rear portion of both the front and rear pairs of hangers. Therefore, extending the top portion of the front and rear pairs of hangers longitudinally rearward further than the bottom portion, so that the hangers extend and taper generally downwardly toward the front end of the vehicle, would appear to more effectively dissipate the stresses on the main members arising from these multi-directional loads during operation of the vehicle.

Applicants have discovered that the stresses at the rear pair of hangers due to multi-directional loads are not as concentrated at the rear portion of the hangers as they are at the front portion of the hangers. It is believed this is the case because the rear pair of hangers are located generally near the longitudinal center of the main members, and therefore the hangers have substantially more frame structure and material frontward and rearward of each rear hanger than do the front hangers. This additional structure in part stabilizes the rear hangers when they encounter multi-directional loads during operation of the vehicle. This is in contrast to the front pair of hangers, which are located adjacent the front end of the main members, and as a result the hangers do not have as much material/structure frontward from them to help stabilize them, which results in the stresses from the longitudinal loads being concentrated at the rear portion of the front pair of hangers during operation of the vehicle. Because longitudinal loads are concentrated at the front portion of the rear hangers rather than the rear portion of the hangers as was previously thought, the prior art arrangement of the hangers does not optimally react the multi-directional loads emanating from roll, side scrub and staggered fore-aft inputs that generally stress the area of the main members between the front and rear pairs of hangers during operation of the vehicle.

Therefore, a need exists in the art for an improved hanger arrangement for axle/suspension systems which optimally reacts loads imparted on the slider box and its main members during operation of the vehicle, resulting in more effective dissipation of concentrated stresses at and adjacent to the front portion of the rear pair of hangers, thereby increasing the life of the slider box.

SUMMARY OF THE INVENTION

Objectives of the present invention include providing a hanger arrangement for axle/suspension systems that reduces localized high stress areas in the main members of the slider box at and adjacent to the front edge of each one of the rear pair of hangers.

A further objective of the present invention is to provide a hanger arrangement for axle/suspension systems that increases the operating life of the slider box.

Yet another objective of the present invention is to provide a hanger arrangement for axle/suspension systems that allows for less material to be utilized in the slider box.

Still another objective of the present invention is to provide a hanger arrangement for axle/suspension systems that reduces weight and allows the vehicle to carry more cargo.

These objectives and advantages are obtained by the hanger

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

FIG. 6 is an enlarged bottom, front, driver side perspective view of the front curb side hanger of the present invention, showing the hanger mounted beneath the curb side main member of the slider box;

Similar numerals refer to similar parts throughout the drawings.

DESCRIPTION OF THE PREFERRED EMBODIMENT

Figure 1:
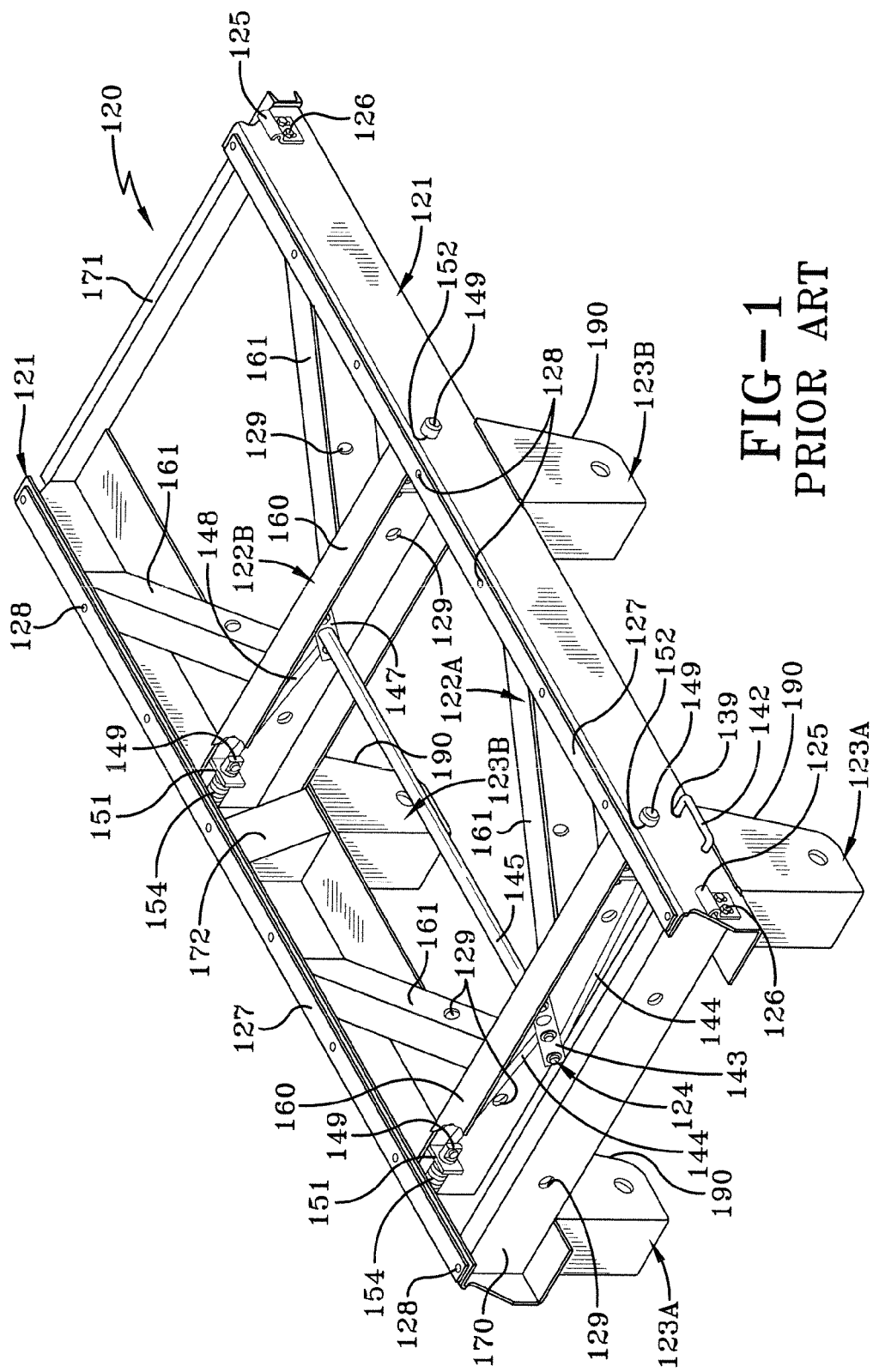
FIG. 1 is a fragmentary perspective view of a slider box for tractor-trailers, showing the arrangement of the prior art front and rear pairs of depending hangers for suspending axle/suspension systems, the pairs of which are identical in structure and are arranged in a similar configuration so that the hangers extend and taper generally downwardly toward the front end of the slider box.

In order to better understand the environment in which the hanger arrangement of the present invention is utilized, a slider box incorporating a prior art hanger arrangement is shown in FIG. 1, is indicated generally at 120, and will now be described in detail below. Slider box 120 includes a pair of main members 121, front and rear generally K-shaped cross member structures 122A and 122B, respectively, front and rear pairs of hangers 123A and 123B, respectively, for suspending axle/suspension systems, and a retractable pin mechanism 124.

More specifically, each main member 121 is an elongated, generally C-shaped beam made of a metal such as steel or other suitable material. The open portion of each main member 121 is opposed to the open portion of the other main member and faces inboard relative to slider box 120. Main members 121 are connected to each other in a spaced-apart parallel relationship by K-shaped cross member structures 122A, B.

Each K-shaped cross member structure 122 includes a base member 160, which extends between and is perpendicular to main members 121. The open portion of each base member 160 faces in a frontward direction. Each end of base member 160 nests in the open portion of a respective one of main members 121, and is secured therein by any suitable means such as welding or mechanical fastening. Each base member 160 is a generally C-shaped beam made of the metal such as steel or other suitable material. Each front hanger 123A is attached, by welding or other suitable means, to the lowermost surface of a respective one of main members 121 at a location directly beneath base member 160 of front K-shaped cross member structure 122A. Each rear hanger 123B is similarly attached at a location directly beneath base member 160 of rear K-shaped cross member structure 122B. Each K-shaped cross member structure 122 further includes a pair of inclined members 161, each of which is a generally C-shaped beam also made of a metal such as steel or other suitable material. The open portion of each inclined member 161 faces in an outboard-frontward direction, and each of the inclined members extend between generally the middle portion of base member 160 and a respective one of the main members 121. The front end of each inclined member 161 is attached to the rearwardmost surface of base member 160 at an angle by any suitable means such as welding or mechanical fastening, and the rear end of each of the inclined members is nested at an angle in the open portion of a respective one of main members 121, and also is attached thereto by any suitable manner such as welding or mechanical fastening. An optional reinforcement bar 171, which extends between the rearwardmost ends of main members 121, adds additional strength to the structure, and is attached thereto by any suitable means such as welding or mechanical fasteners. Thus, it can be seen that base member 160 and inclined members 161 form an integral K-shaped cross member structure 122, which interconnects and maintains main members 121 in a spaced apart parallel relationship.

One or more openings 129 are foamed in the vertically extending surface of each base member 160 and each inclined member 161, and each of the openings 129 is aligned with the corresponding openings formed in the other members to provide for passage of air and/or fluid conduits, electrical lines, and the like used in the operation of the tractor-trailer (not shown).

Each main member 121 has a pair of rail guides 125 mounted on its outboard surface by bolts 126. Each rail guide 125 is mounted adjacent to a respective one of the ends of main member 121. A low friction strip 127 is attached to the uppermost surface of each main member 121 by recessed fasteners 128, and extends generally the entire length of main member 121. Strip 127 is formed of any suitable low friction material, such as ultra-high molecular weight polyethylene.

As mentioned above, and as best shown in FIG. 2, slider box 120 supports front and rear axle/suspension systems. However, only front axle/suspension system 130 is shown in the drawings and described herein since the front and rear systems are identical in structure and operation. Moreover, inasmuch as axle/suspension system 130 is suspended from slider box 120, but does not form an integral part thereof, only the major components of system 130 will be cited for aiding in the description of the environment in which the slider box operates. Axle/suspension system 130 includes generally identical suspension assemblies 131 (only one shown) suspended from each hanger 123A of the pair of front hangers. A reinforcement box 172 is mounted by any suitable means in the open portion of each main member 121, frontward of and adjacent to each end of each of base members 160, to provide additional strength to slider box 120 for supporting hangers 123A,B and their associated suspension assemblies 131. Each suspension assembly 131 includes a suspension beam 132, which is pivotally mounted on hanger 123A in a usual manner. An air spring 133 is suitably mounted on and extends between the upper surface of the rearwardmost end of suspension beam 132 and main member 121 at a location directly beneath the outboard end of a respective one of inclined members 161 of K-shaped cross member structure 122A. A shock absorber 134 extends between and is mounted on suspension beam 132 and the respective inclined member 161. Another component of suspension assembly 131, mentioned herein only for the sake of relative completeness, is an air brake 135. An axle 137 extends between and is captured in the pair of suspension beams 132 of axle/suspension system 130. One or more wheels 138 are mounted on each end of axle 137.

Slider box 120 is movably mounted on the trailer body (not shown) by slideable engagement of rail guides 125 with spaced apart, parallel and generally Z-shaped rails 141, which are mounted on and depend from the underside of the trailer body. Each low friction strip 127 abuts the bottom surface of the uppermost portion of a respective one of rails 141 to provide a smooth, generally friction-free contact surface for slideable movement of slider box 120 on the trailer body.

Slider box 120 can be selectively positioned relative to the trailer body for optimum load distribution by retractable pin mechanism 124. Pin mechanism 124 includes a generally L-shaped handle 142 which passes through an opening 139 formed in a selected one of main members 121. It can be seen that the bent end portion of handle 142, which extends outwardly from the outboard side of main member 121, is accessible for easy grasping by an operator of the tractor-trailer. The inboard end of handle 142 is pivotally attached to a lever 143, which in turn is pivotally attached to a pair of arms 144 which extend in opposite outboard directions from lever 143. Lever 143 further is attached to an elongated pivot rod 145 which passes rearward through an opening (not shown) formed in base member 160 of front K-shaped cross member structure 122A. The end of pivot rod 145 remote from lever 143 is similarly attached to a remote lever 147, which in turn is pivotally attached to a pair of arms 148 which extend in opposite outboard directions from lever 147. The upward end of each of arms 144, 148 is bent and is pivotally attached to the inboard end of a pin 149.

The inboard end of each pin 149 is slideably mounted in an opening (not shown) formed in a bracket 151 which is attached by suitable means such as welding to a respective one of base members 160. The enlarged outboard end of each pin 149 passes through an opening 152 formed in a respective one of main members 121. When it is desired to lock slider box 120 in a selected position relative to the trailer body, the main member openings 152 are aligned with selective ones of a plurality of correspondingly sized openings 153 formed in rails 141 of the trailer body. Each pin 149 automatically extends through the selected aligned openings 152, 153 since the pin is biased in an outboard direction by a coil spring 154 captured between bracket 151 and the enlarged outboard end of pin 149. When it is again desired by the operator of the tractor-trailer to move slider box 120 beneath the trailer body, the parking brake of the trailer is engaged, and the handle 142 is pulled in an outboard direction to retract pins 149 out of the rail openings 153, and slider box 120 is moved longitudinally along rails 141 until main member openings 152 align with selective rail openings 153 and pins 149 engage therewith as described hereinabove for maximizing load distribution.

Figure 3:
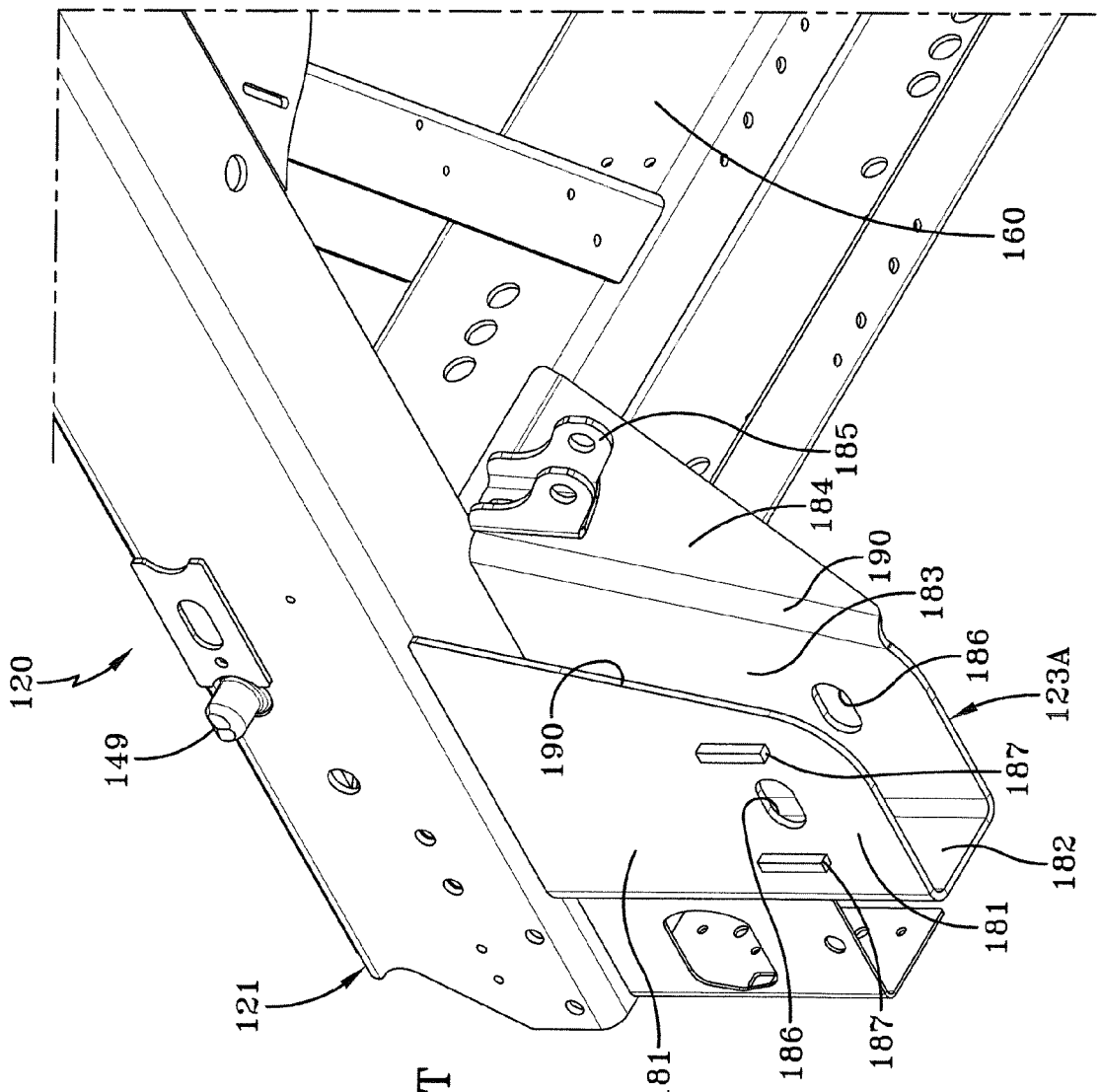
FIG. 3 is a greatly enlarged fragmentary perspective view of the front driver side prior art hanger shown in FIGS. 1 and 2, and showing the hanger mounted beneath the underside of its respective main member of the slider box.

With additional reference to FIG. 3, prior art hanger 123A is shown mounted on main member 121 of slider box 120 and will be described in detail below. Hanger 123A includes a generally U-shaped horizontal cross section having an outboard wall 181, a front wall 182 and an inboard wall 183. A flange 184 extends inboardly from the rear edge of inboard wall 183 of hanger 123A and is attached to base member 160. A shock mount 185 is attached to the rear surface of flange 184 by any suitable means, such as welding. A pair of aligned elongated openings 186 are formed through outboard wall 181 and inboard wall 183 of hanger 123A. A pair of alignment guides 187 are formed on the outboard surface of outboard wall 181 of hanger 123A. Hanger 123A is mounted on main member 121 of slider box 120 via a weld (not shown) which extends around the upper edge of outboard wall 181, front wall 182 and inboard wall 183.

Figure 2:
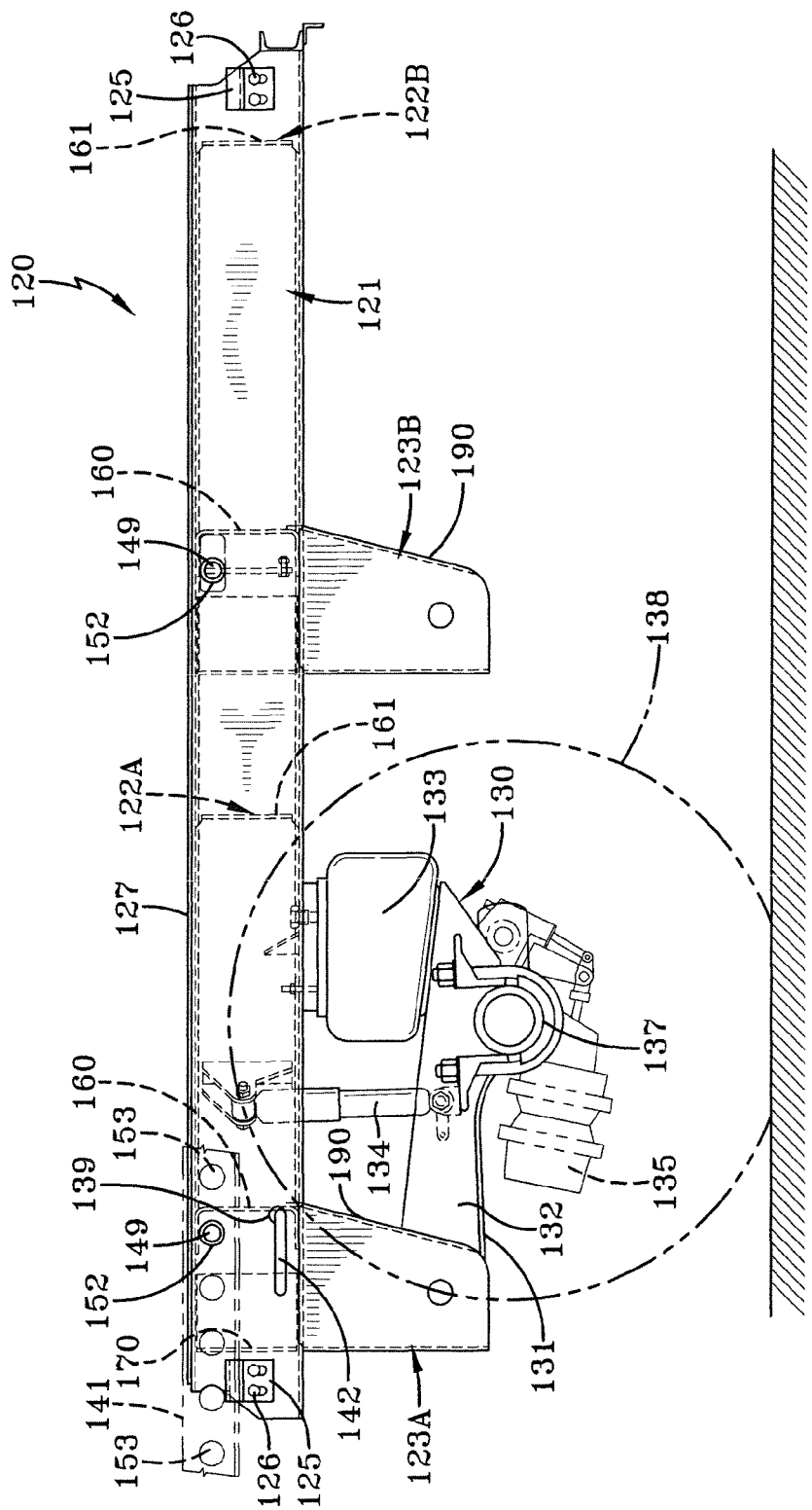
FIG. 2 is an enlarged fragmentary side view of the slider box shown in FIG. 1, showing the front axle/suspension system mounted on the front driver side hanger, showing the driver side rear hanger with the rear axle/suspension system removed, and showing the location of the wheels in broken lines and showing hidden portions of the front and rear driver side hangers and the slider box in broken lines.

With particular reference to FIGS. 1 and 2, front and rear hangers 123A,B are arranged on slider box 120 so that each of the front and rear pairs of hangers are similarly arranged on the slider box, wherein the front and rear hangers each extend and taper generally toward the front end of the slider box.

More specifically, slider box 120 includes paired spaced-apart depending front hangers 123A, each one of which includes a generally vertical front wall 182. The top portion of hanger outboard wall 181 and hanger inboard wall 183 each extend further in the rearward direction than the bottom portion of each of the hanger outboard and inboard walls. Thus, a generally straight rear edge 190 of each of hanger outboard wall 181 and hanger inboard wall 183 angles and extends generally downwardly-frontwardly toward the front end of the slider box. Slider box 120 also includes paired spaced-apart depending rear hangers 123B, each one of which includes a generally vertical front wall 182. The top portion of hanger outboard wall 181 and hanger inboard wall 183 each extend further in the rearward direction than the bottom portion of each of the hanger outboard and inboard walls. Thus, a generally straight rear edge 190 of each of hanger outboard wall 181 and hanger inboard wall 183 angles and extends generally downwardly-frontwardly toward the front end of the slider box.

More particularly, front and rear pairs of hangers 123A,B are constructed and arranged in this manner because it was previously thought that the predominant multi-directional loads for both the front and rear pairs of hangers were concentrated at the rear end of the hangers. Therefore, it was heretofore thought that having the top portion of each of hanger outboard wall 181 and hanger inboard wall 183 extend further in the rearward direction than the bottom portion of the hanger outboard and inboard walls would more effectively dissipate the stresses on main members 121 during operation of the vehicle. However, it has been discovered that the stresses at rear paired hangers 123B, due to multi-directional loads, are not as concentrated at the rear portion of the hangers as they are at the front portion of the hangers. This is because rear pair of hangers 123B are located near the longitudinal center of main members 121 and, therefore, the hangers have much more structure and material in front of and behind them to help stabilize them when they encounter multi-directional loads during operation of the vehicle. This is in contrast to front pair of hangers 123A, which are located at the front of main members 121. These hangers do not have as much structure and material in front of them to help stabilize them, which results in the stresses from the multi-directional loads being concentrated at the rear of the front pair of hangers during operation of the vehicle. Because multi-directional loads are concentrated at the front of rear hangers 123B rather than the rear of the hanger as was previously thought, the prior art arrangement of the hangers does not optimally react the multi-directional loads emanating from roll, side scrub and staggered fore-aft inputs that generally stress the area of the main member between the front and rear pairs of hangers during operation of the vehicle.

Therefore, a need exists in the art for a hanger construction and arrangement for an axle/suspension system that better reacts loads imparted on the slider box during operation of the vehicle, resulting in more effective dissipation of concentrated stresses at the front of the rear pair of hangers, thereby increasing the life of slider box main members and thus the slider box. The hanger arrangement of the present invention overcomes the problems associated with prior art hanger arrangements and will now be described in detail below.

Figure 4:
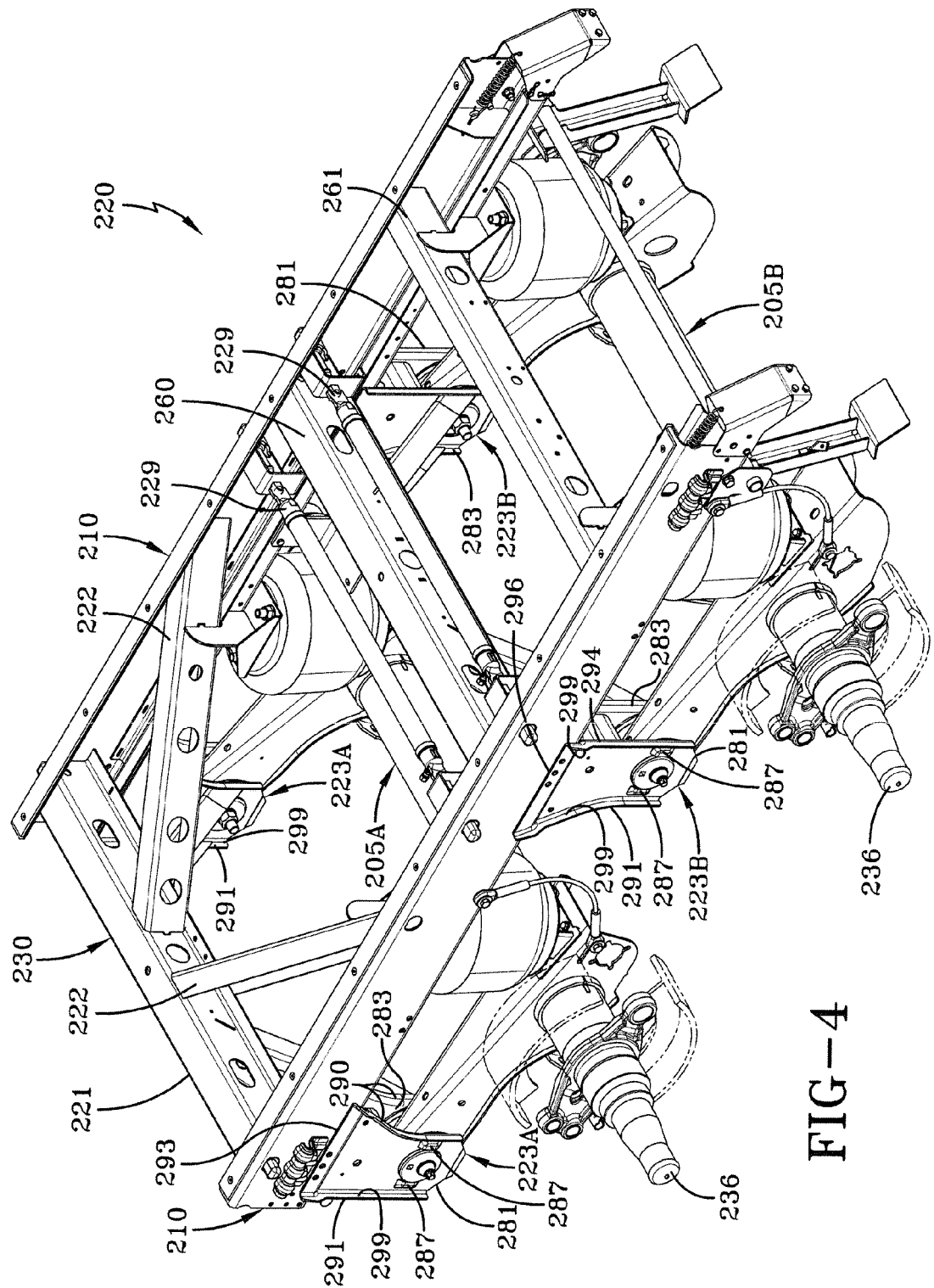
FIG. 4 is a top, rear, driver side perspective view of a slider box incorporating the hanger arrangement for axle/suspension systems of a tractor-trailer of the present invention, showing the arrangement of the front and rear pairs of hangers of a subframe of a heavy-duty vehicle, where the top portion of each one of the front pair of hangers extends further in the rearward direction than the bottom portion of each hanger, and the top portion of each one of the rear pair of hangers extends further in the frontward direction than the bottom portion of each hanger, and showing a front axle/suspension system pivotally connected to the front pair of hangers and a rear axle/suspension system pivotally connected to the rear pair of hangers.
Figure 5:
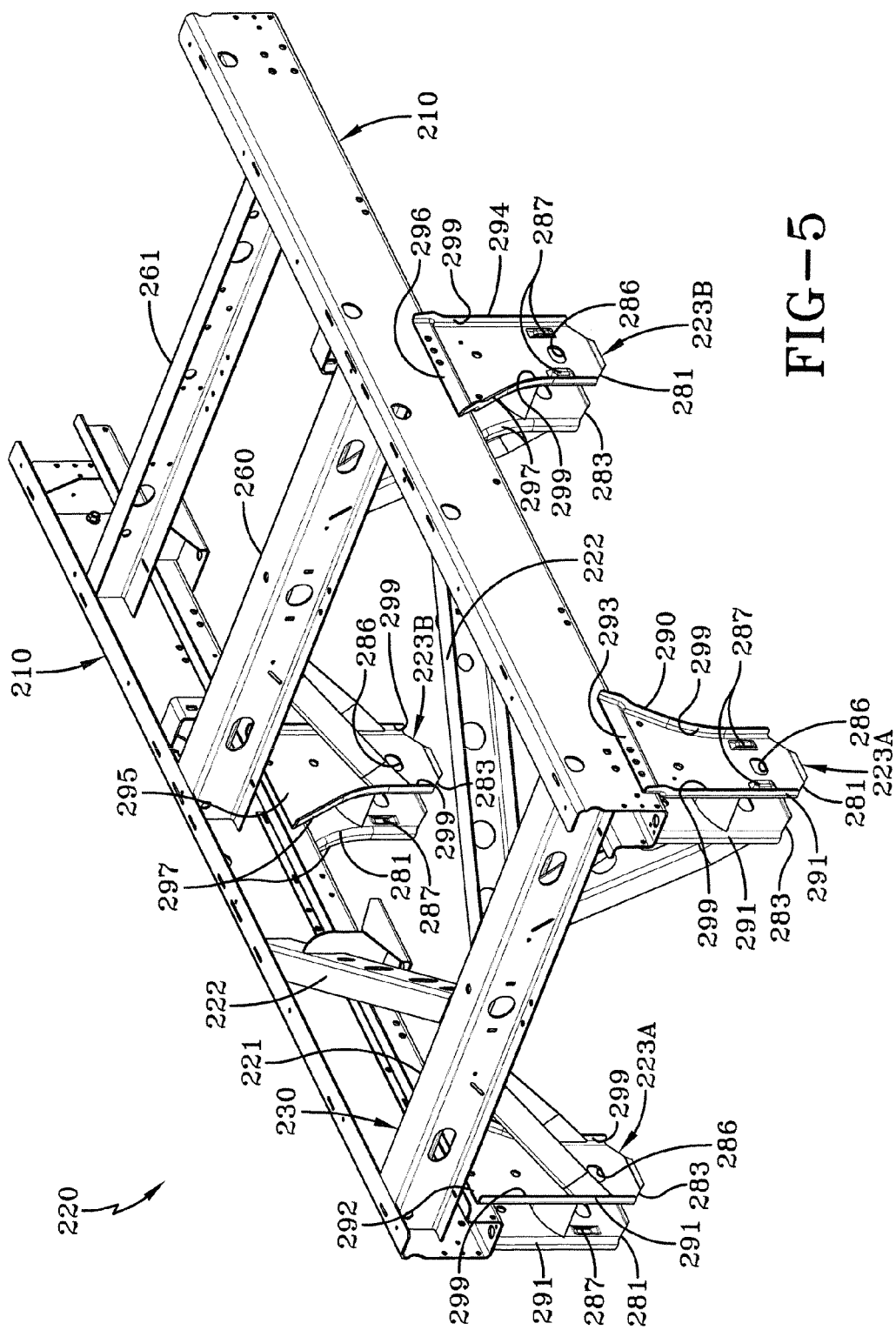
FIG. 5 is a top, front, driver side perspective view of the slider box shown in FIG. 4, but with the front and rear axle/suspension systems removed.

A preferred embodiment hanger arrangement of the present invention is shown in FIGS. 4 and 5 incorporated into a slider box 220 for a semi-trailer and will be described in detail below.

Slider box 220 includes a pair of main members 210, a front generally K-shaped cross member 230, a rear cross member 260, a rear cross brace 261, and front and rear pairs of hangers 223A and 223B, respectively. Cross member 230 includes a base member 221 and a pair of angled cross brace members 222. Each one of cross brace members 222 is connected at its inboard end to the rear surface of the middle portion of base member 221 and at its outboard end to a respective one of inboard surfaces of main members 210. Main members 210 each have a generally G-shaped vertical cross-section. Front and rear pairs of hangers 223A and 223B, respectively, depend from respective ones of main members 210. Hangers 223A,B are longitudinally spaced from one another and pivotally mount front and rear axle/suspension systems 205A,205B. A pair of retractable pin mechanisms 229 used for locking slider box 220 in place on a primary frame (not shown) of a vehicle also are shown, but do not form part of the slider box. Wheels (not shown) are rotatably mounted on axle spindles 236 of axle/suspension systems 205A,B in a manner well known to those skilled in the art. Tires (not shown) are mounted on each of wheels in a manner well known to those having skill in the art.

Figure 6A:
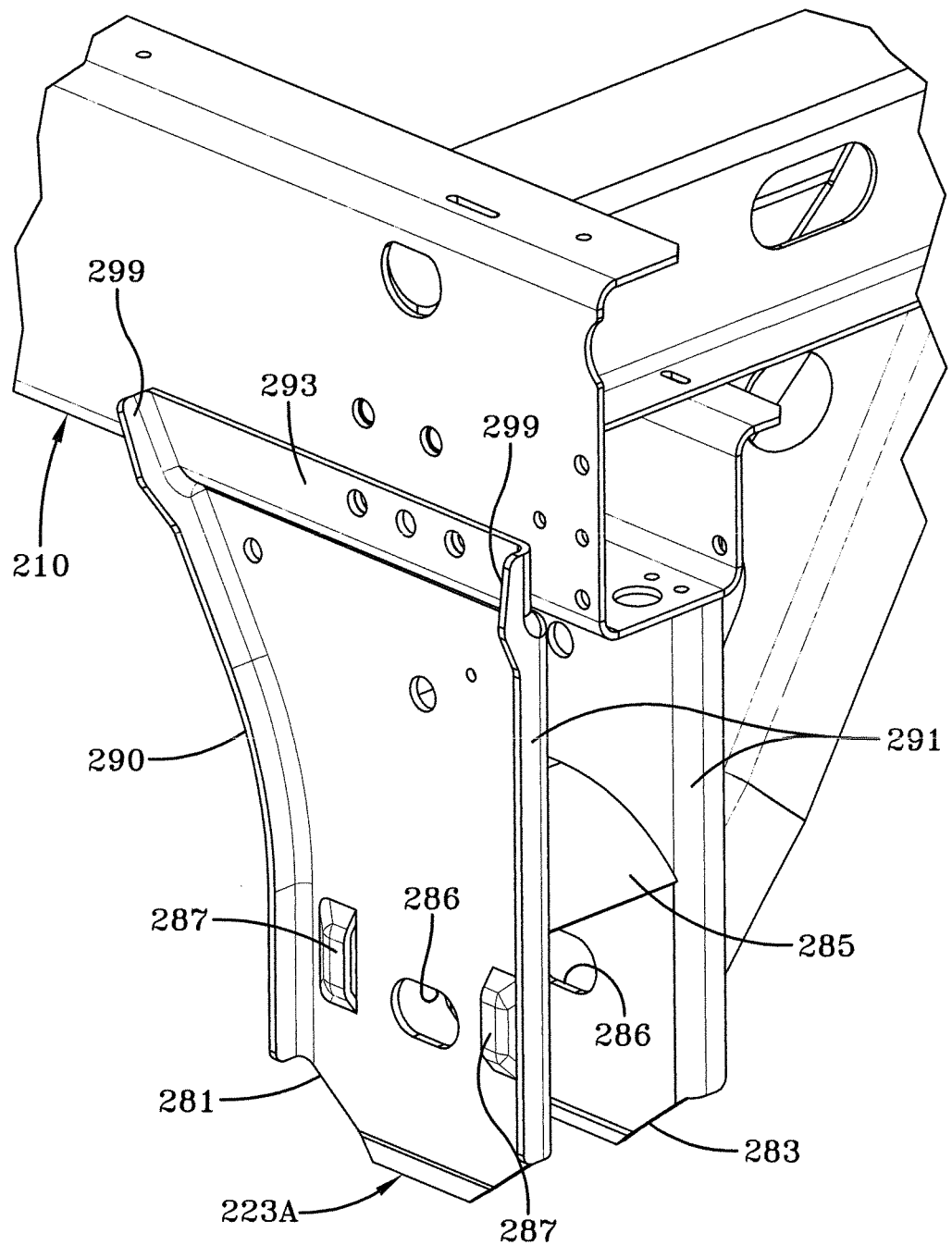
FIG. 6A is an enlarged top, front curb side perspective view of the front curb side hanger shown in FIG. 6.
Figure 7:
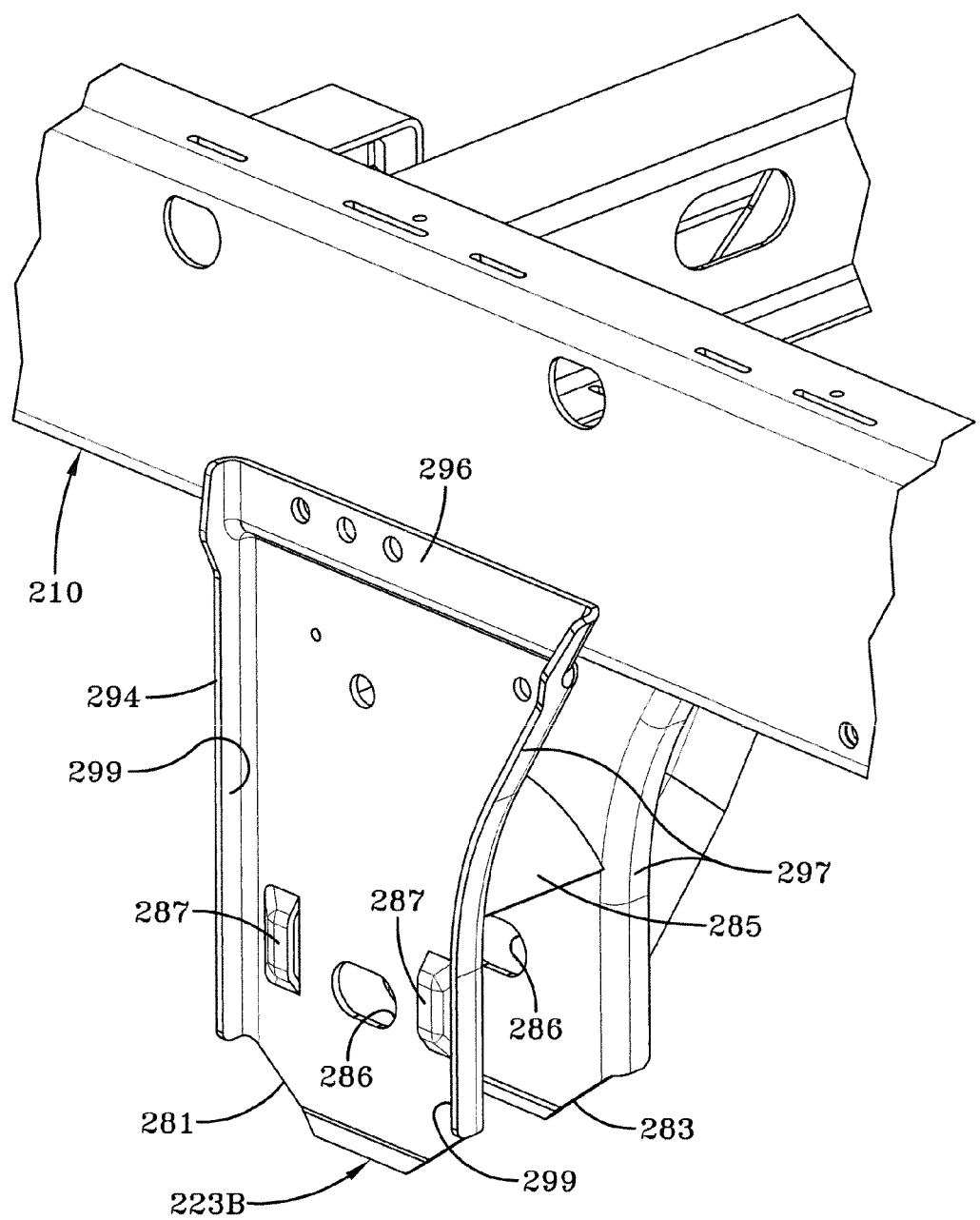
FIG. 7 is an enlarged top, front, curb side perspective view of the rear curb side hanger of the present invention, showing the hanger mounted beneath the curb side main member of the slider box.
Figure 7A:
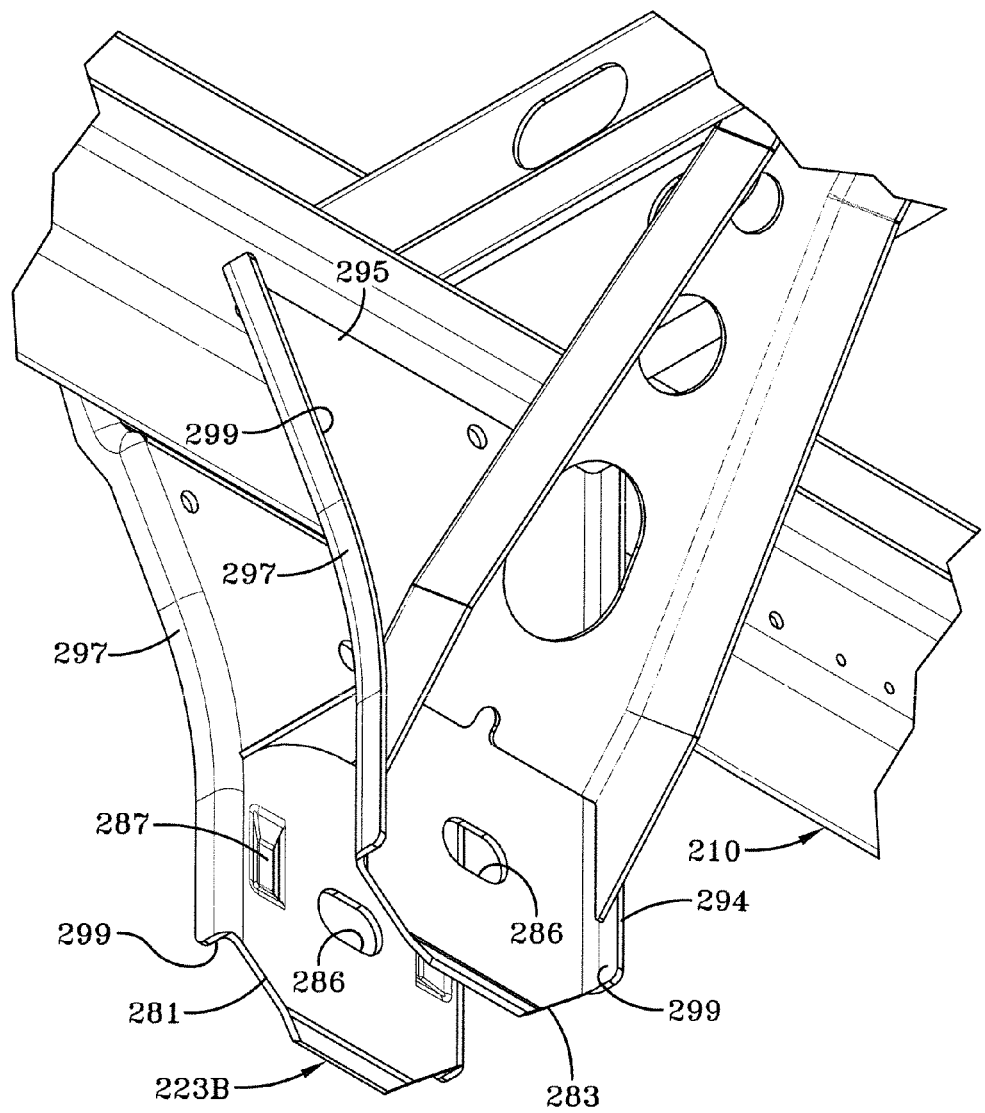
FIG. 7A is an enlarged bottom, front perspective view of the rear curb side hanger shown in FIG. 7.

With particular reference to FIGS. 6, 6A, 7 and 7A, and in accordance with one of the primary features of the present invention, front hanger 223A and rear hanger 223B are shown mounted on main member 210 of slider box 220 and will be described in detail below. Because front and rear hangers 223A,B are structurally similar to one another, for purposes of clarity and conciseness, only the curb side front hanger will be described herein, with the understanding that the driver side front hanger as well as the driver side and curb side rear hangers each has a similar overall structure, although the overall arrangement of the front and rear pairs of hangers is different as set forth below. With particular reference to FIGS. 6 and 6A, hanger 223A includes an outboard wall 281 and an inboard wall 283. A flange 299 is formed along each of the front and rear edges of outboard wall 281 and inboard wall 283. A web 285 extends between inboard wall 283 and outboard wall 281, is connected to the inboard and outboard walls of hanger 223A, and maintains the proper spacing of the inboard and outboard walls of the hanger. A pair of aligned elongated openings 286 are formed through outboard wall 281 and inboard wall 283 of hanger 223A. A pair of alignment guides 287 are formed in outboard wall 281 of hanger 223A. Hanger 223A is mounted on main member 210 of slider box 220 via a weld (not shown) which extends along the upper edge of outboard wall 281 and inboard wall 283. Hanger 223A does not include a front wall and is therefore generally lighter than prior art hanger 123A.

In accordance with another primary feature of the present invention, the arrangement of front and rear hangers 223A,B is shown in FIG. 5 and will be described in detail below. Hangers 223A,B are arranged on slider box 220 so that each of the front and rear pairs of hangers are arranged on each main member of the slider box in an opposed, or mirror image, relationship, with the front pair of hangers extending and tapering generally toward the front end of the slider box and with the rear pair of hangers extending and tapering generally toward the rear end of the slider box. More specifically, slider box 220 includes paired spaced-apart depending front hangers 223A, each one of which includes generally vertical front edges 291 and top edges 292,293 of inboard and outboard walls 283,281, respectively. Inboard and outboard wall top edges 292,293, respectively, each extend longitudinally toward the rear end of the slider box further than its respective bottom portion of the hanger outboard and inboard walls. Thus, a generally curved rear edge 290 of each of hanger outboard wall 281 and hanger inboard wall 283 is formed, and extends generally downwardly-frontwardly toward the front end of the slider box.

Slider box 220 also includes paired spaced-apart depending rear hangers 223B, each one of which includes generally vertical rear edges 294 and top edges 295,296 of inboard and outboard walls 283,281, respectively. Inboard and outboard wall top edges 295,296, respectively, each extend longitudinally toward the front end of the slider box further than its respective bottom portion of the hanger outboard and inboard walls. Thus, a generally curved front edge 297 of each of hanger outboard wall 281 and hanger inboard wall 283 is formed and extends generally downwardly-rearwardly toward the rear end of the slider box.

Front and rear pairs of hangers 223A,B are arranged in this manner in order to optimally react the multi-directional loads imparted on the slider box during operation of the vehicle. As set forth above, it has been discovered that the stresses at rear hangers 223B due to multi-directional loads are not as concentrated at the rear portion of the hangers as they are at the front portion of the hangers. This is because rear pair of hangers 223B are located generally near the longitudinal center of main members 210 and, therefore, each one of the hangers has significantly more structure and material in front of and behind it to help stabilize it when it encounters multi-directional loads during operation of the vehicle. This is in contrast to front pair of hangers 223A, which are located at the front end of main members 210. As a result, each of front hangers 223A does not have as much structure/material in front of it, i.e., it is located adjacent to the front edge of main member 210. Because each one of the front pair of hangers 223A does not have as much material in front of it to stabilize it, this results in the stresses from the multi-directional loads being concentrated at the rear of each one of the front pair of hangers during operation of the vehicle. Because front hangers 223A include top edges 292,293 of inboard and outboard walls 283,281, respectively, that extend longitudinally toward the rear end of the slider box further than the bottom portion of the hanger outboard and inboard walls, the hanger arrangement efficiently reacts multi-directional loads imparted on the front pair of hangers during operation of the vehicle. These multi-directional loads include those imparted to the hangers as a result of roll, side scrub and staggered fore-aft inputs that generally stress the area of main member 210 between the front and rear pairs of hangers during operation of the vehicle. In contrast, the multi-directional loads are unexpectedly concentrated at the front of rear hangers 223B rather than the rear of the hanger as is the case with front hangers 223A. Because rear hangers 223B include top edges 295,296 of inboard and outboard walls 283,281, respectively, of the hanger that extend longitudinally toward the front end of the slider box further than the bottom portion of the hanger inboard and outboard walls, the hanger arrangement optimally reacts multi-directional loads imparted on the rear pair of hangers during operation of the vehicle. These multi-directional loads include those imparted to the hangers as a result of roll, side scrub and staggered fore-aft inputs that generally stress the area of main member 210 between the front and rear pairs of hangers during operation of the vehicle. The optimal reaction of the multi-directional loads by front and rear pairs of hangers 223A,B results in longer life for the front and rear hangers, main members 210 and slider box 220.

The preferred embodiment hanger arrangement of the present invention described in detail above, overcomes the problems associated with the prior art hanger arrangement of the front and rear pairs of hangers, by providing a hanger construction and arrangement that better reacts the multi-directional loads emanating from roll, side scrub, and staggered fore-aft inputs that generally stress the areas of main members 210 between the front and rear pairs of hangers during operation of the vehicle, which provides longer life to the hangers and the main members of the slider box, and which allows less material to be utilized in the slider box structure.

The hanger arrangement of the present invention can be utilized in conjunction with all types of trailing-arm axle/suspension systems, including those used in conjunction with primary frames, moveable or non-moveable subframes, and including trucks, tractor-trailers, semi-trailers and other heavy-duty and/or non-heavy-duty vehicles. It is also contemplated that the hanger arrangement of the present invention could be utilized with all types of trailing-arm axle/suspension systems, without changing the overall concept or operation of the present invention.

Accordingly, the hanger arrangement for axle/suspension systems is simplified, provides an effective, safe, inexpensive and efficient structure and method which achieves all the enumerated objectives, provides for eliminating difficulties encountered with prior art hanger arrangements, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the hanger arrangement for axle/suspension systems is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An arrangement and structure of hangers for axle/suspension systems of a heavy-duty vehicle comprising:
   a) a front pair of hangers, each one of said front hangers attached to said heavy-duty vehicle and supporting a front axle/suspension system having a front pair of suspension beams,
   b) a rear pair of hangers, each one of said rear hangers attached to said heavy-duty vehicle and supporting a rear axle/suspension system having a rear pair of suspension beams, said rear pair of hangers being longitudinally spaced rearwardly from said front pair of hangers, wherein each one of said front suspension beams is pivotally mounted on a respective one of said front pair of hangers, said pivotal mounting being offset frontwardly relative to inboard and outboard wall top edges of the front pair of hangers, and wherein each one of said rear suspension beams is pivotally mounted on a respective one of said rear pair of hangers, said pivotal mounting being offset rearwardly relative to inboard and outboard wall top edges of the rear pair of hangers.

2. The arrangement of hangers for axle/suspension systems of a heavy-duty vehicle of claim 1, further comprising a rear edge of each one of said front hangers extending generally downwardly frontwardly toward a front end of said vehicle.

3. The arrangement of hangers for axle/suspension systems of a heavy-duty vehicle of claim 1, wherein each one of said front pair of hangers includes a pair of transverse spaced apart walls, and wherein each one of said rear pair of hangers includes a pair of transverse spaced apart walls.

4. The arrangement of hangers for axle/suspension systems of a heavy-duty vehicle of claim 1, wherein said attachment of each one of said front pair of hangers to said front axle/suspension system is a pivotal attachment, and wherein said attachment of each one of said rear pair of hangers to said rear axle/suspension system is a pivotal attachment.

5. The arrangement of hangers for axle/suspension systems of a heavy-duty vehicle of claim 3, further comprising a flange formed along a front edge of each one of said pair of transverse spaced apart walls.

6. The arrangement of hangers for axle/suspension systems of a heavy-duty vehicle of claim 3, further comprising a flange formed along a rear edge of each one of said pair of transverse spaced apart walls.

7. The arrangement of hangers for axle/suspension systems of a heavy-duty vehicle of claim 3, further comprising a pair of aligned elongated openings formed through each one of said pair of transverse spaced apart walls.

8. The arrangement of hangers for axle/suspension systems of a heavy-duty vehicle of claim 3, further comprising a pair of alignment guides formed on a selected one of each one of said pair of transverse spaced apart walls.

9. An arrangement and structure of hangers for axle/suspension systems of a heavy-duty vehicle comprising:
   a) a front pair of hangers, each one of said front hangers attached to said heavy-duty vehicle and supporting a front axle/suspension system,
   b) a rear pair of hangers, each one of said rear hangers attached to said heavy-duty vehicle and supporting a rear axle/suspension system, said rear pair of hangers being longitudinally spaced rearwardly from said front pair of hangers, each one of said rear hangers extending generally downwardly rearwardly toward a rear end of said vehicle further comprising a web disposed between and connected to each one of said pair of transverse spaced apart walls.

* * * * *